(12) United States Patent
Chao et al.

(10) Patent No.: US 8,379,647 B1
(45) Date of Patent: Feb. 19, 2013

(54) SEQUENCING PACKETS FROM MULTIPLE THREADS

(75) Inventors: Chih-Wei Chao, Saratoga, CA (US); Dongyi Jiang, Milpitas, CA (US); Rakesh Gopala Krishnan Nair, Sunnyvale, CA (US); Jiaxiang Su, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 456 days.

(21) Appl. No.: 11/877,146

(22) Filed: Oct. 23, 2007

(51) Int. Cl.
*H04L 12/28* (2006.01)
*H04L 12/56* (2006.01)

(52) U.S. Cl. .................... 370/394; 370/413; 370/414

(58) Field of Classification Search .......... None
See application file for complete search history.

(56) References Cited

U.S. PATENT DOCUMENTS

| | | | | |
|---|---|---|---|---|
| 5,524,263 A * | 6/1996 | Griffth et al. | ......... | 712/23 |
| 5,629,928 A * | 5/1997 | Calvignac et al. | ......... | 370/237 |
| 6,131,113 A * | 10/2000 | Ellsworth et al. | ......... | 709/213 |
| 6,505,283 B1 * | 1/2003 | Stoney | ......... | 711/170 |
| 6,804,815 B1 * | 10/2004 | Kerr et al. | ......... | 718/100 |
| 6,862,282 B1 * | 3/2005 | Oden | ......... | 370/394 |
| 6,876,657 B1 * | 4/2005 | Brewer et al. | ......... | 370/394 |
| 6,904,039 B1 * | 6/2005 | Hung et al. | ......... | 370/390 |
| 7,035,212 B1 * | 4/2006 | Mittal et al. | ......... | 370/230 |
| 7,124,196 B2 * | 10/2006 | Hooper | ......... | 709/232 |
| 7,161,938 B1 * | 1/2007 | Hung et al. | ......... | 370/389 |
| 7,248,586 B1 * | 7/2007 | Hughes et al. | ......... | 370/394 |
| 7,287,255 B2 * | 10/2007 | Potter, Jr. | ......... | 718/102 |
| 7,295,563 B2 * | 11/2007 | Hughes | ......... | 370/412 |
| 7,349,399 B1 * | 3/2008 | Chen et al. | ......... | 370/394 |
| 7,522,606 B1 * | 4/2009 | Sendrovitz | ......... | 370/394 |
| 7,899,052 B1 * | 3/2011 | Hao et al. | ......... | 370/392 |
| 2004/0042456 A1 * | 3/2004 | Dittmann et al. | ......... | 370/392 |
| 2004/0081094 A1 * | 4/2004 | Melvin et al. | ......... | 370/230 |
| 2004/0240473 A1 * | 12/2004 | Kumar et al. | ......... | 370/474 |
| 2004/0246980 A1 * | 12/2004 | Balakrishnan | ......... | 370/412 |
| 2005/0047338 A1 * | 3/2005 | Hoffman et al. | ......... | 370/230 |
| 2005/0190779 A1 * | 9/2005 | Hoffman et al. | ......... | 370/412 |
| 2005/0286526 A1 * | 12/2005 | Sood et al. | ......... | 370/394 |
| 2006/0056424 A1 * | 3/2006 | Lih et al. | ......... | 370/401 |
| 2007/0124545 A1 * | 5/2007 | Blanchard et al. | ......... | 711/152 |
| 2007/0140297 A1 * | 6/2007 | Chung et al. | ......... | 370/473 |
| 2007/0195107 A1 * | 8/2007 | DuBois et al. | ......... | 345/589 |
| 2009/0049162 A1 * | 2/2009 | Kuo et al. | ......... | 709/223 |

* cited by examiner

*Primary Examiner* — Ayaz Sheikh
*Assistant Examiner* — Peter Chau
(74) *Attorney, Agent, or Firm* — Harrity & Harrity, LLP (57) ABSTRACT

A device may reserve a slot for a received packet in a packet ordering queue (POQ), convey the packet to one of a plurality of threads for processing, obtain the packet from the one of the plurality of threads after the packet has been processed, organize the packet in the POQ in accordance with a position of the reserved slot, and release the packet from the POQ if the reserved slot is a head of the POQ.

15 Claims, 12 Drawing Sheets

SEQUENCING PACKETS FROM MULTIPLE THREADS

BACKGROUND

Today's network device, such as a router or a switch, may employ multiple threads to handle received packets. By distributing work among several threads, the network device may accelerate packet switching, routing, rendering firewall services, and/or other types of processing.

SUMMARY

According to one aspect, a device may include a plurality of service threads for processing packets, a packet ordering queue (POQ) for ordering the packets after the plurality of service threads process the packets, a packet distribution thread, and a packet ordering thread. The packet distribution thread may be configured to receive the packets, reserve slots in the POQ for the packets in an order of their arrival, and queue the packets for the plurality of service threads. The packet ordering thread may be configured to obtain the packets from the plurality of service threads, place information relating to the packets in the reserved slots in the POQ, and release the packets from the reserved slots in the order of their arrival.

According to one aspect, a method may include reserving a slot for a received packet in a packet ordering queue (POQ), conveying the packet to one of a plurality of threads for processing, obtaining the packet from the one of the plurality of threads after the packet has been processed, organizing the packet in the POQ in accordance with a position of the reserved slot, and releasing the packet from the POQ if the reserved slot is a head of the POQ.

According yet another aspect, a device may include means for receiving packets in a sequence, means for reserving slots for the received packets in a packet ordering queue (POQ), means for transferring the packets to a plurality of flow threads, means for obtaining the packets from the plurality of flow threads out-of-order, means for placing the out-of-order packets in the reserved slots, and means for sending the packets from the POQ in the sequence.

DETAILED DESCRIPTION OF PREFERRED EMBODIMENTS

The following detailed description refers to the accompanying drawings. The same reference numbers in different drawings may identify the same or similar elements.

In the following, a circular buffer may be used to sequence processed packets from multiple threads. When the packets are received at a component, the multiple threads may process the packets in parallel. However, because processing delays for different threads are variable, the threads may complete their processing of the packets out-of-order. In such a case, the circular buffer may be used to organize the processed packets in the same order that the packets were received.

The term "thread," as used herein, may refer to a sequence of instructions that may run independently of other threads. The thread may share data with other threads. As used herein, the term "thread" may also be interpreted to refer to a program, an instance of a program, or a thread instance.

The term "packet," as used herein, may refer to an Internet Protocol (IP) packet, datagram, cell, a fragment of an IP packet, or other types of data that may be carried at a specified communication layer. For example, a packet may refer to an IP packet that has been pre-pended with additional header fields (e.g., metadata fields).

The term "circular buffer," as used herein, may refer to a buffer where the first block of memory follows the last block of memory. A block of memory that follows another block of memory in a circular buffer may not necessarily occupy contiguous regions of memory (e.g., a circular buffer that is made of a linked list).

The term "source," as used herein, may refer to a node (e.g., network node, etc.) from which packets originate. The term "destination," as used herein, may refer to a node to which the packets are sent. A source or a destination may be a logical network source or destination that is associated with one or more identifiers, such as an Internet Protocol (IP) address, a port number, etc.

The term "flow," as used herein, may refer to a stream of packets from a source to a destination. As used herein, the term "flow statistics" may refer to information about a flow, such as a byte count, a number of packets, etc.

The term "address," as used herein, may refer not only to a memory address, but, to a reference to a region of memory. The term "reference," as used herein, may include a network address, a variable name, a memory offset, or other data or information (e.g., an identifier) that may be used to obtain the location of the region of memory. The address or the reference may be used to obtain contents of the memory region.

As used herein, the term "service module" may refer to, within a network device, a logical or physical unit for performing a set of tasks or a service for a packet that arrives at the network device. For example, a service module may provide a load balancing service, a firewall service, an intrusion detection system (IDS) service, a hypertext transfer protocol (HTTP) service, an encryption/decryption service, etc. A service module may be implemented in hardware, software, or a combination of hardware and software.

In the following, a circular buffer may be used to sequence packets in the same order that the packets are received at a component (e.g., a data plane, a hardware module for inspecting a packet's compliance to a security requirement, etc.). When the packets are received, multiple threads may process them in parallel. However, because processing delays for different threads are variable, the threads may finish processing the packets out-of-order.

To ensure processed packets are in a proper sequence, slots on the circular buffer may be reserved in the order the packets were received. After the packets have been processed by threads, the packets may be placed in the reserved slots. The referenced packets may be released from the slot in the order the slots are reserved, and, therefore, in the order that the packets were received at the component.

Without the circular buffer, the packets may be sent from the circular buffer out-of-order. For example, if packet A arrives before packet B and thread X finishes processing packet B before thread Y finishes processing packet A, packet B may be sent from the component before packet A. With the circular buffer, packet B may be prevented from being sent before packet A is processed and sent.

Figure 1:
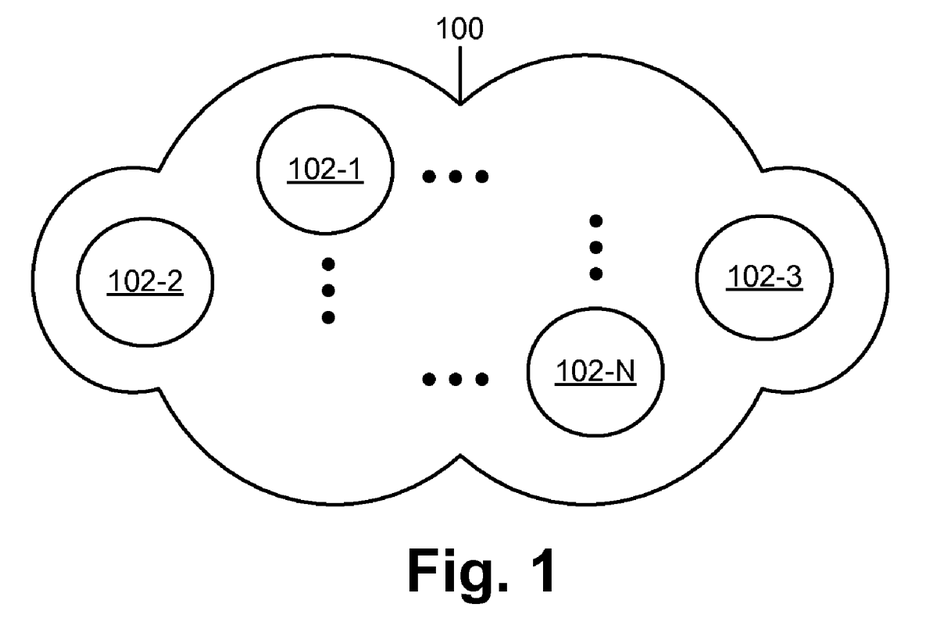
FIG. 1 is a diagram of an exemplary network in which concepts described herein may be implemented.

FIG. 1 is a diagram of an exemplary network 100 in which concepts described herein may be implemented. Network 100 may include the Internet, an ad hoc network, a local area network (LAN), a wide area network (WAN), a metropolitan area network (MAN), a cellular network, a public switched telephone network (PSTN), an intranet, or a combination of networks.

As shown, network 100 may include N network devices 102-1 through 102-N (collectively referred to herein as "network device 102"). Each of network devices 102-1 through 102-N may include a switch, a router, a server, a firewall, and/or another type of device. While network devices 102 may be implemented as different types of devices, in the following paragraphs, network devices 102 will be described herein in terms of a router, a switch, or a firewall.

Figure 2:
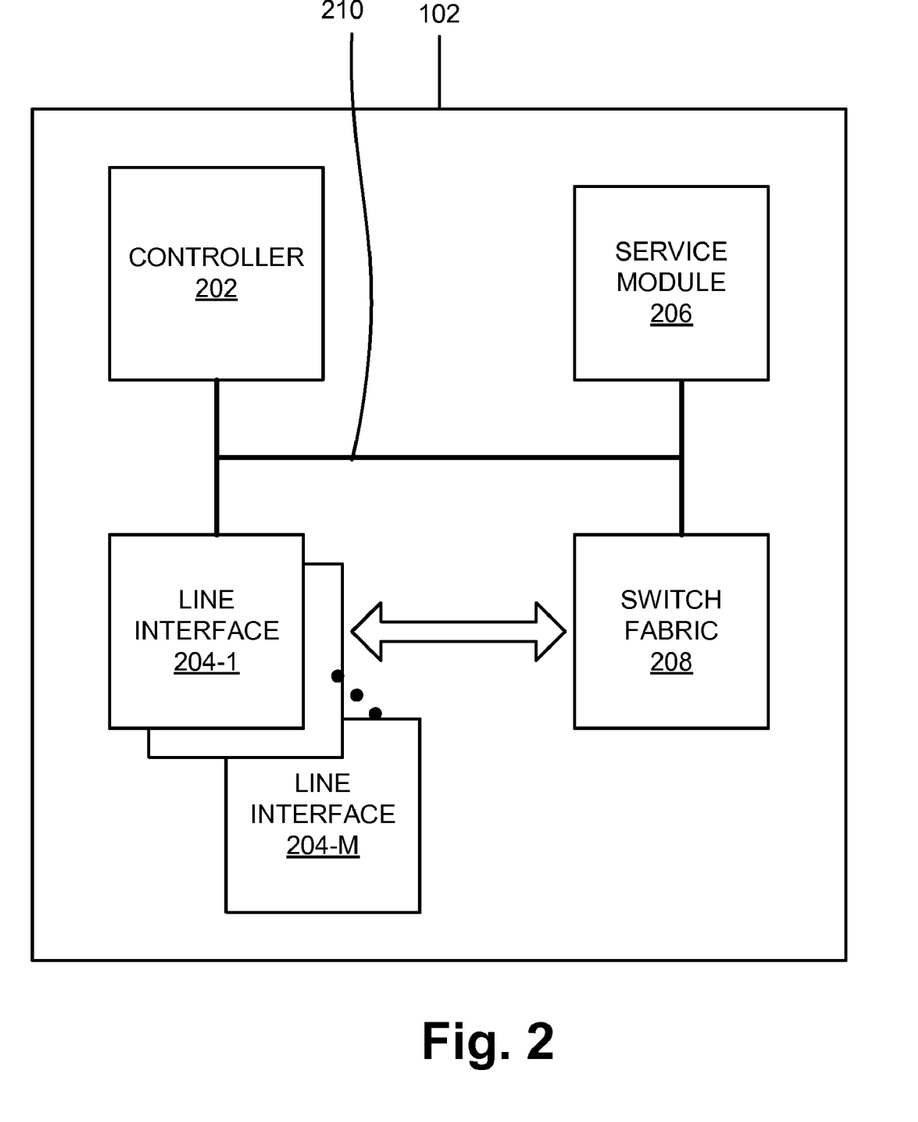
FIG. 2 is a block diagram of an exemplary network device of the exemplary network of FIG. 1.

FIG. 2 is a block diagram of an exemplary network device 102. As shown, network device 102 may include a controller 202, M line interfaces 204-1 through 204-M (collectively referred to herein as "line interface 204"), a service module 206, a switch fabric 208, and a communication path(s) 210. Depending on implementation, network device 102 may include additional, fewer, or different components than those illustrated in FIG. 2. For example, in one implementation, network device 102 may include additional service modules for rendering network services, such as a firewall service, a load balancing service, etc.

Controller 202 may include one or more devices for managing routes and/or types of information that demand centralized processing. Controller 202 may manage routes (e.g., accept or disseminate routes) in accordance with routing/signaling protocols. Line interfaces 204-1 through 204-M may include devices for receiving packets from network devices in network 100 and for transmitting the packets to other network devices in network 100. In addition, each of line interfaces 204-1 through 204-M may perform packet forwarding, packet classification, and/or internal redirection of packets to other components in network device 102 (e.g., service module 206).

Service module 206 may include hardware, software, or a combination of hardware and software for rendering services related to a received packet. The services may be rendered via multiple threads. After processing the packet, service module 206 may drop the packet or direct the packet to another service module (not shown) or to one of line interfaces 204-1 through 204-M.

Switch fabric 208 may include switches for conveying packets to/from line interfaces 204-1 through 204-M and/or service module 206 from/to others of line interfaces 204-1 through 204-M or service modules (not shown). Communication path(s) 210 may provide an interface through which components of network device 102 can communicate with one another.

Figure 3:
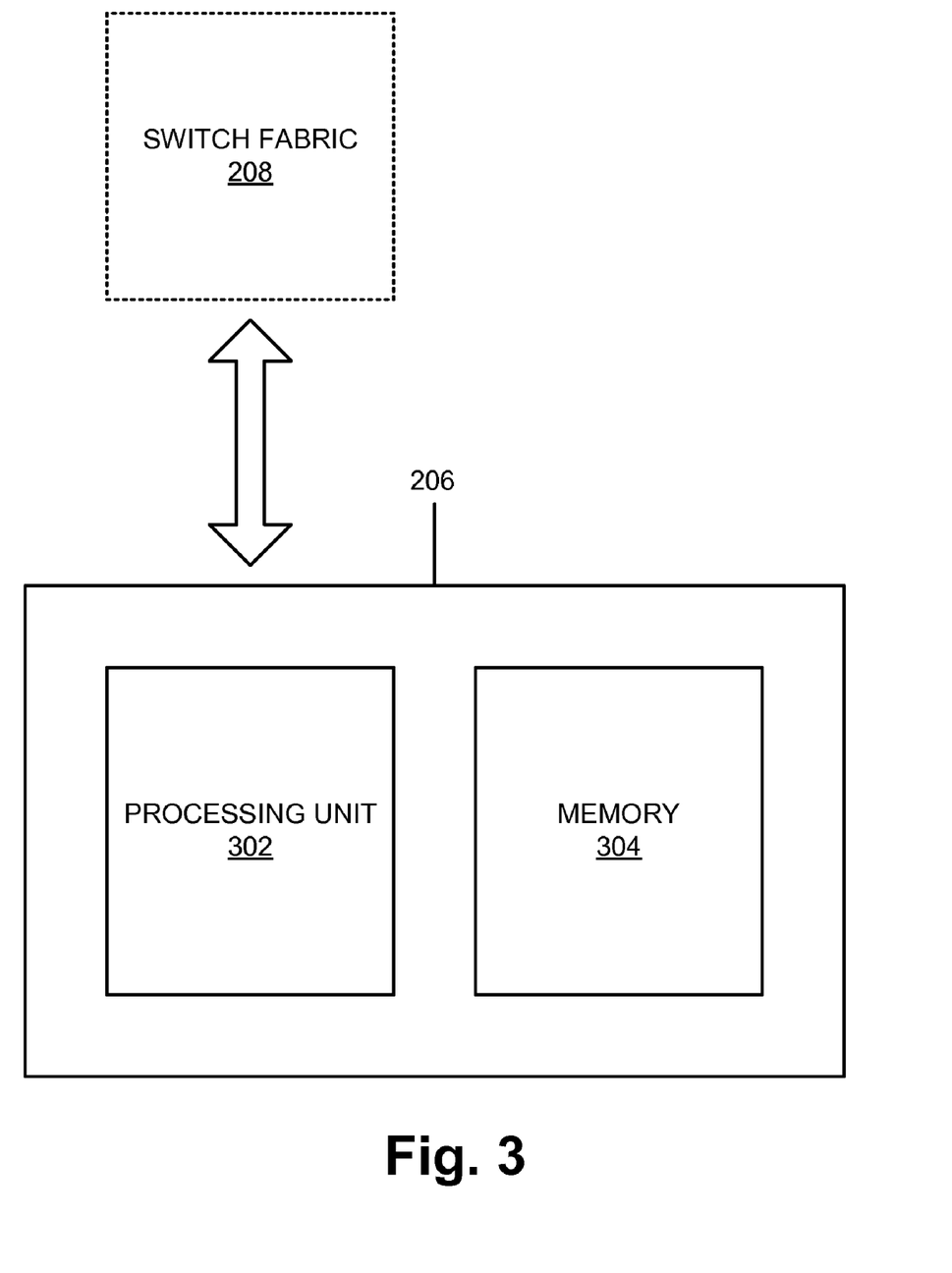
FIG. 3 is a block diagram of an exemplary service module of FIG. 2.

FIG. 3 is a block diagram of service module 206. As shown, service module 206 may include a processing unit 302 and a memory 304. Depending on implementation, service module 206 may include additional, fewer, and/or different components than those illustrated in FIG. 3.

Processing unit 302 may include one or more processors, microprocessors, Application Specific Integrated Circuits (ASICs), and/or Field Programmable Gate Arrays (FPGAs), and/or other processing logic. Memory 304 may include static memory, such as read only memory (ROM), and/or dynamic memory, such as random access memory (RAM), or onboard cache, for storing data and machine-readable instructions.

Figure 4:
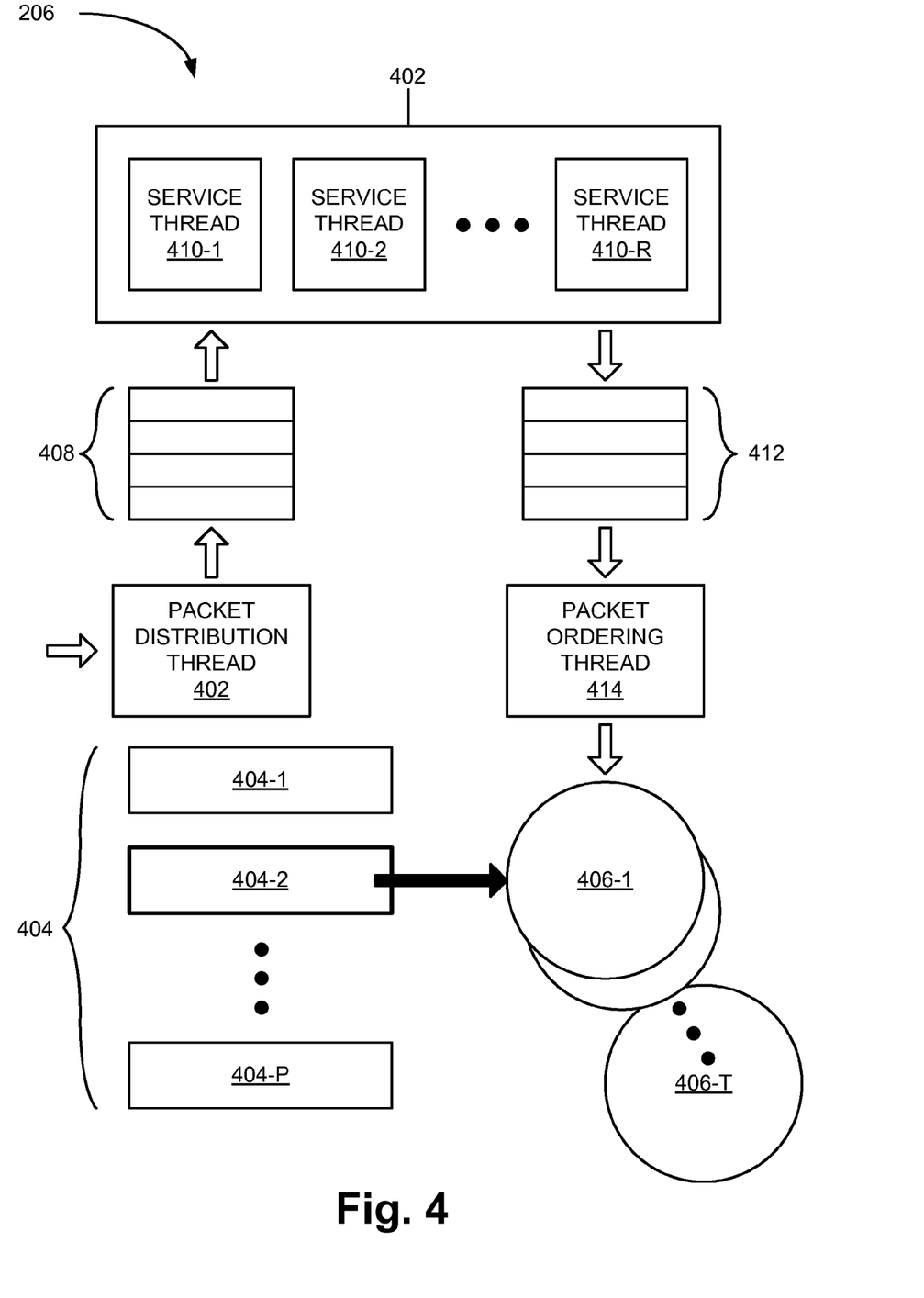
FIG. 4 is a functional block diagram of the exemplary service module of FIG. 3.

FIG. 4 is a functional block diagram of service module 206. As shown, service module 206 may include packet distribution thread (PDT) 402, P address holders 404-1 through 404-P (collectively referred to herein as address holders 404 and individually as address holder 404-$x$), T packet ordering queues (POQs) 406-1 through 406-T (collectively referred to herein as POQs 406 and individually POQ 406-$x$), an ingress queue (IN_QUEUE) 408, R service threads 410-1 through 410-R (collectively referred to herein as service threads 410 and individually as service thread 410-$x$), an egress queue (OUT_QUEUE) 412, and a packet ordering thread (POT) 414. Depending on implementation, service module 206 may include additional, fewer, or different functional components than that illustrated in FIG. 4. For example, service module 206 may contain other threads for communication services.

PDT 402 may include an instance of a thread for preparing packets to be distributed to service threads 410-1 through 410-R. When PDT 402 receives a packet, PDT 402 may store information, which will be described below, related to POQ 406-$x$ in the packet, and hand off the packet to IN_QUEUE 408. In some implementations, the order in which PDT 402 receives packets may mirror the order in which the packets are received by service module 206.

Address holder 404-$x$ may store either a null value (e.g., value that does not indicate an address or a reference) or an address of POQ 406-$x$, and may provide the address of POQ 406-$x$ to a thread. In some implementations, an address holder may be stand-alone or may be part of another block of memory, such as a link in a linked list, a record (e.g., a flow record), a table, etc. A thread that needs to access POQ 406-$x$ may do so by first locating address holder 404-$x$ that stores the address of POQ 406-$x$.

POQs 406 may include circular buffers to organize packets that are placed in OUT_QUEUE 412. More than one POQ 406-$x$ may be provided, so that packets that are placed in one POQ 406-$x$ may not block packets that are placed in other POQs 406. As already explained in part, slots (e.g., a block of memory) in POQ 406-$x$ may be reserved for packets in the order that the packets are received by PDT 402. After the packets have been processed by service threads 410, the packets may be placed in the reserved slots by writing references to the packets in the reserved slots. Once the references have been written in the slots in POQ 406-$x$, the packets may be released from POQ 406-$x$. In some implementations, releasing the packets may entail additional processing, such as sending the packets from service module 206 to another component in network device 102 or to another network device.

IN_QUEUE 408 may include one or more blocks of memory for queuing packets. IN_QUEUE 408 may receive packets from PDT 402 and hold the packets until the packets are distributed to one or more of service threads 410.

Service thread 410-$x$ may include an instance of a thread for processing packets that are received, rendering a particular service for the packet (e.g., security violation detection), and handing off the packet to OUT_QUEUE 412. In FIG. 4, even though service threads 410-1 through 410-R are shown as being identical, in a different implementation, one or more of service threads 410-1 through 410-R may render a different service. OUT_QUEUE 412 may include one or more blocks of memory for queuing packets. OUT_QUEUE 412 may receive a packet from service thread 410-x and temporarily hold the packet until the packet is removed by POT 414.

POT 414 may include an instance of a thread/process for sequencing packets that are in OUT_QUEUE 412. POT 414 may remove a packet from OUT_QUEUE 412, access the information that has been stored by PDT 402 in the packets, and use the information to order the packets in POQ 406-x.

In some implementations, one or more of the components in FIG. 4 may be implemented in memory 304 during runtime. In such an implementation, address holder 404-x and/or POQ 406-x for sequencing a packet may not yet exist when the packet is received at PDT 402. Furthermore, if the packet is received and address holder 404-x and/or POQ 406-x for sequencing the packet does not exist, address holder 404-x and/or POQ 406-x may be dynamically created in memory 304.

Figure 5:
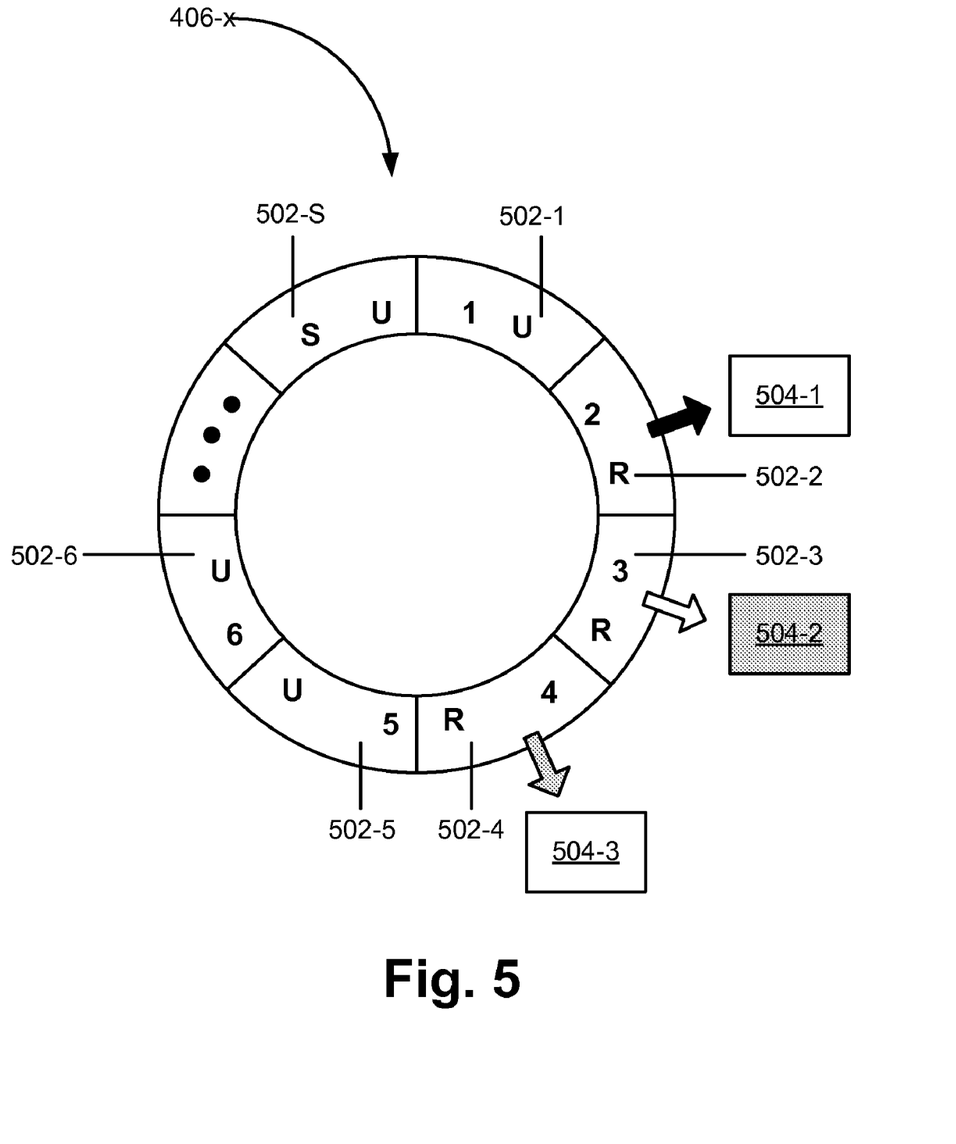
FIG. 5 is a functional diagram of an exemplary packet ordering queue (POQ) of FIG. 4.

FIG. 5 is a functional block diagram of POQ 406-x. As shown, POQ 406-x may include slots 502-1 through 502-S. Each of slots 502-1 through 502-S may be associated with a predetermined index (e.g., slot 502-1 may be associated with an index of 1) that can be used to identify a particular slot. Furthermore, slots 502-1 through 502-S may be either reserved for packets (e.g., packets 504-1 through 504-3) or un-reserved. In FIG. 5, a reserved slot and an un-reserved slot are shown with "R" and "U," respectively, and reserved slots 502-2 through 502-4 are illustrated as being associated with packets 504-1 through 504-3.

In FIG. 5, reserved slots 502-2 through 502-5 may include a head, which is the position that is occupied by slot 502-2 in POQ 406-x, and a tail, which is the position occupied by slot 502-5 in POQ 406-x. A head may identify the first of the reserved slots, and the tail may identify the slot after the last reserved slot. Different slots may become the head and the tail, as PDT 402 makes new reservations in POQ 406-x and POT 414 removes (e.g., "un-reserves") existing reservations from POQ 406-x.

When a PDT 402 receives a new packet, PDT 402 may reserve a slot by writing, in the packet, the index associated with the tail slot as the packet's arrival position, and by designating the slot that immediately follows the last tail as the new tail. For example, in FIG. 5, assume that PDT 402 receives a new packet. PDT 402 may reserve a slot by writing the index of the tail slot (e.g., "5") in the packet, and setting slot 502-6 as the tail. Thus, each time PDT 402 makes a reservation in POQ 406-x, the tail may shift to a different slot, unless the tail slot is the same as the head slot. In such a case, no more slots may be available for reservation.

A slot in POQ 406-x may become available for reservation, when a slot becomes un-reserved. Un-reserving the slot may involve placing the packet in the reserved slot, and releasing the packet from POQ 406-x if the reserved slot is the head of POQ 406-x.

More specifically, when a POT 414 obtains a packet from OUT_QUEUE 412, POT 414 may place the packet in the reserved slot by: matching the arrival position of the packet (e.g., the index that has been written into the packet by PDT 402) to one of indices of reserved slots 502-1 through 502-5; and writing a reference to the packet into the slot whose index matches the arrival position. In FIG. 5, the marked slot is indicated by a darkened packet (e.g., packet 504-2). In contrast, slot 502-2 that is associated with packet 504-1 is not dark, indicating POT 414 has not found packet 504-1 in OUT_QUEUE 412 and matched the index of "2" with the arrival position of packet 504-1.

If the slot is also the head of POQ 406-x, POT 414 may release the packet from POQ 406-x. To release the packet, POT 414 may designate a slot that immediately follows the head as the new head of POQ 406-x. For example, in FIG. 5, assuming that packet 504-1 has been placed in OUT_QUEUE 412 and that the arrival position of packet 504-1 matches index "2," POT 414 may release packet 504-1 from POQ 406-x by designating slot 502-3 as the head of POQ 406-x.

In the above, because packets that are associated with the reserved slots of POQ 406-x are in the order of their arrival at PDT 402, sweeping movement of the head of POQ 406-x in one direction (e.g., the clockwise direction) may also release the packets in the order of their arrival. By moving the head to a different slot only when a processed packet is associated with the head slot, POT 414 may ensure the release of the packet in the proper sequence.

In brief, in POQ 406-x, reserved slots may include a head and a tail. A head may identify the first of the reserved slots, and the tail may identify the slot after the last reserved slot. Different slots may become the head and the tail, as PDT 402 makes new reservations in POQ 406-x and POT 414 removes (e.g., "un-reserves") existing reservations from POQ 406-x. Reserving a slot in POQ 406-x may shift a tail to a new position and render the slot unavailable for another reservation. Un-reserving the slot may free the slot and release a packet that is referenced by the slot.

Exemplary Process for Placing a Packet in an Exemplary Ingress Queue

Figure 6:
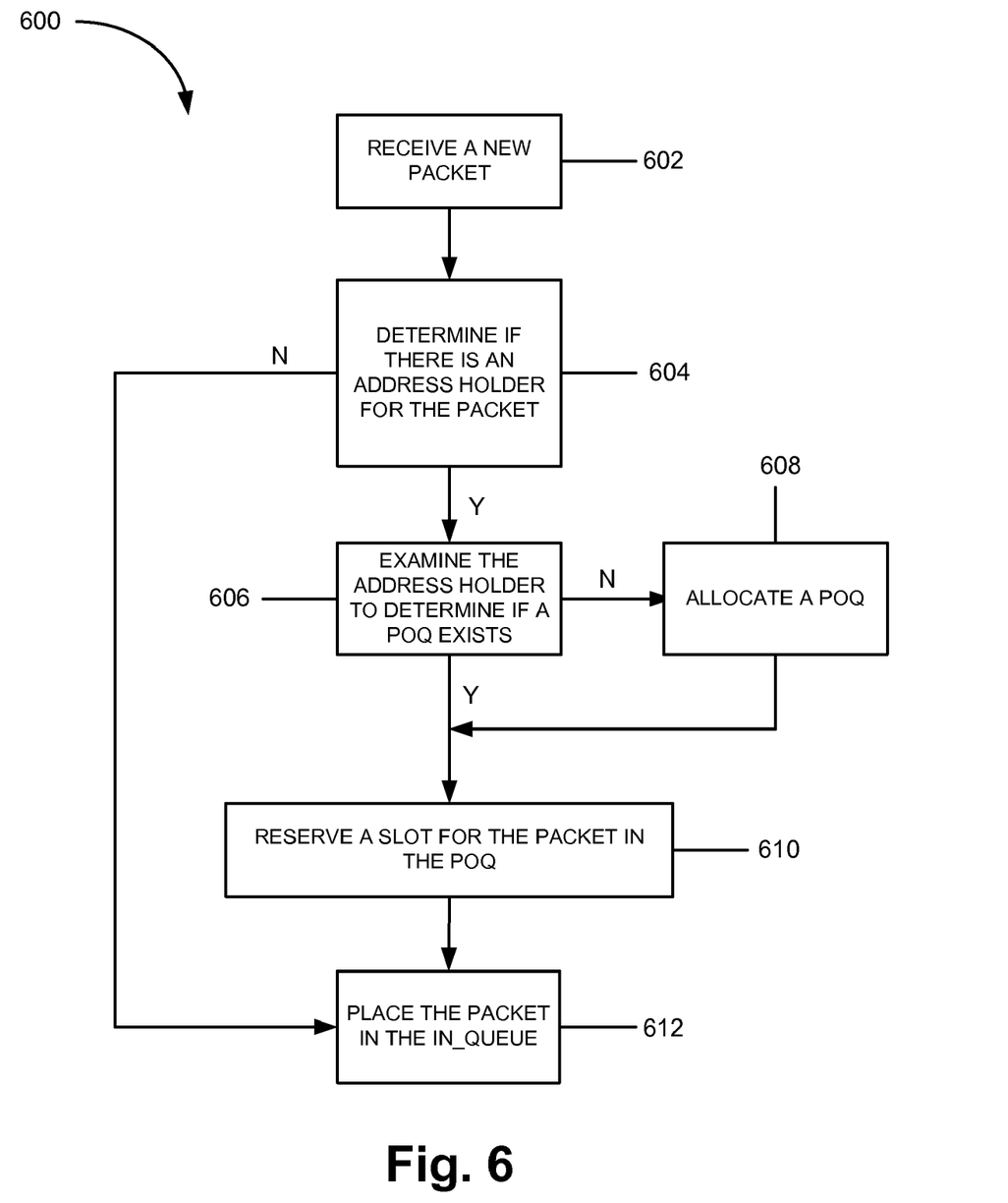
FIG. 6 is a flow diagram of an exemplary process for placing a packet in an exemplary ingress queue (IN_QUEUE) of FIG. 4.
Figure 7:
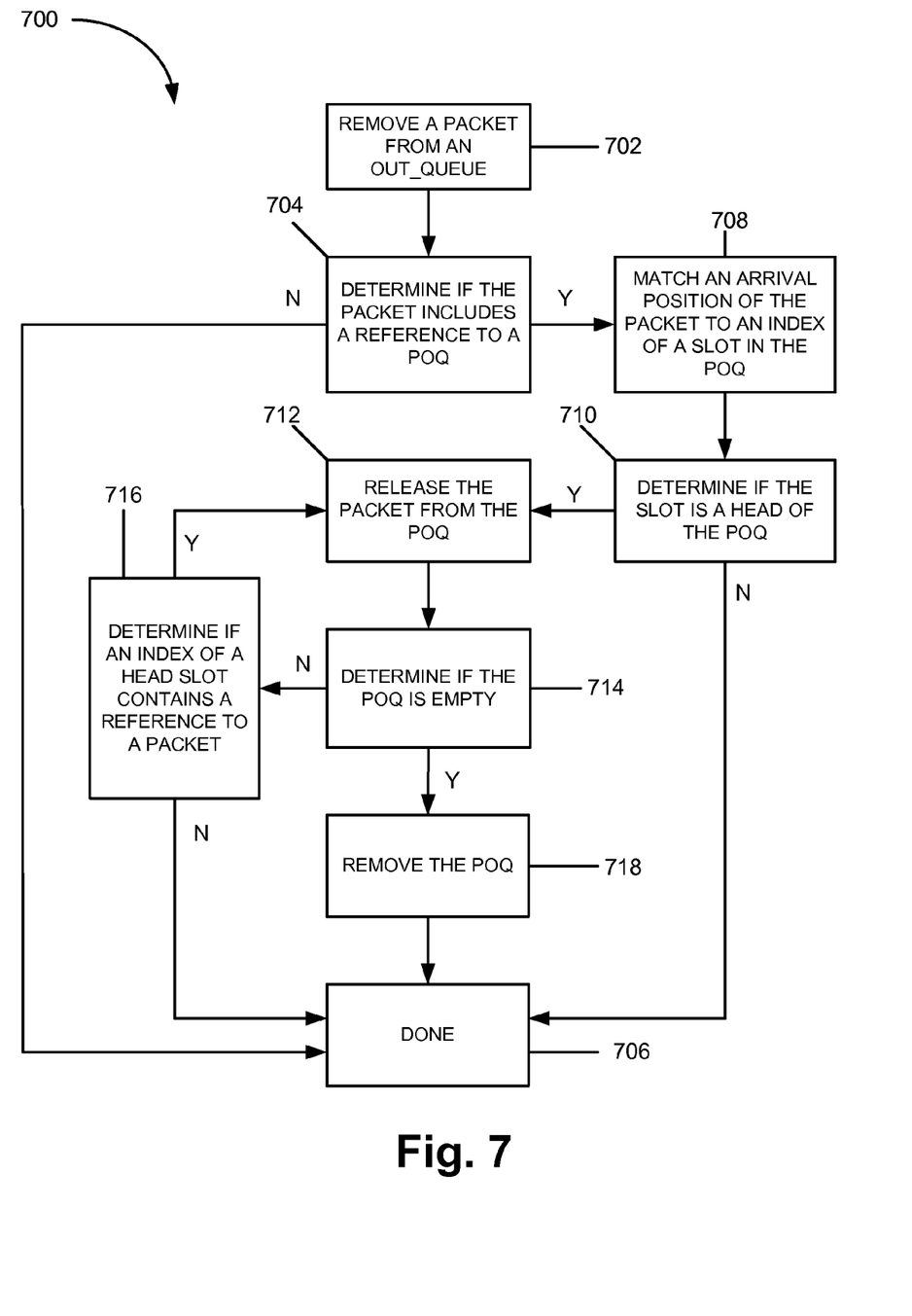
FIG. 7 is a flow diagram of an exemplary process for sequencing packets using a packet ordering queue (POQ) of FIG. 4.

The above paragraphs describe system elements that are related to devices and/or components for sequencing packets from multiple threads. FIGS. 6 and 7 are flow diagrams of exemplary processes 600 and 700 that are capable of being performed by one or more of these devices and/or components.

FIG. 6 is a flow diagram of an exemplary process for placing a packet in IN_QUEUE 408. Process 600 may start at block 602 where a new packet may be received (block 602). Depending on implementation, the packet may be received at PDT 402 or at another component (e.g., a buffer within service module 206).

It may be determined if there is an address holder 404-x for the packet (block 604). In one implementation, address holder 404-x may be part of a flow record. In such a case, header information from the packet may be extracted and used to locate the flow record to which the packet is related. If address holder 404-x does not yet exist (e.g., a flow record for the packet does not exist), process 600 may proceed to block 612, where the packet may be placed in IN_QUEUE 408. In one implementation, address holder 404-x for the flow may be created by one of service threads 410.

Returning to block 604, if address holder 404-x exists, process 600 may proceed to block 606, where address holder 404-x may be examined to determine if POQ 406-x exists. In some implementations, existence of address holder 404-x may imply the existence of POQ 406-x(e.g., POQ 406-x is created at the same time as address holder) and block 606 may be omitted. During the examination of address holder 404-x, address holder 404-x may temporarily be locked to prevent another thread (e.g., an instance of POT 414) from modifying contents of address holder 404-x, delete POQ 406-x, or modify POQ 406-x.

If POQ 406-*x* does not exist, POQ 406-*x* may be allocated (block 608). Allocating POQ 406-*x* may include writing a reference to POQ 406-*x* in address holder 404-*x*. From block 608, process 600 may proceed to block 610.

Returning to block 606, if POQ 406-*x* already exists, process may proceed to block 610, where a reference to a slot for the packet may be reserved in POQ 406-*x*. The reservation may include involve writing an arrival position, which is the index of the tail of POQ 406-*x*, in the packet. After the writing, the tail of the POQ 406-*x* may be assigned to another slot that follows the current tail slot. Once the tail has been assigned, the lock on address holder 404-*x* may be released.

The packet may be placed in IN_QUEUE 408 (block 612). Placing the packet in IN_QUEUE 408 may involve writing a reference to the packet in a slot within IN_QUEUE 408. Depending on whether other threads are inserting/removing packets to/from IN_QUEUE 408 or whether a single instruction can remove/insert the packet, IN_QUEUE 408 may or may not be locked during the placement of the packet. The inserted packet may wait in IN_QUEUE 408 until the packet is distributed to service threads 410. If a new packet arrives at PDT 402, process 600 may return to block 602.

Exemplary Process for Sequencing Packets Using a Packet Ordering Queue

FIG. 7 is a flow diagram of an exemplary process for 408 for sequencing packets using POQ 406-*x*. Prior to the start of process 700, packets in IN_QUEUE 408 may have been distributed to service threads 410. Service threads 410 may process the packets and place the packets in OUT_QUEUE 412.

Process 700 may start at block 702, where a packet may be removed from OUT_QUEUE 412. Depending on whether service threads 410 are inserting packets in OUT_QUEUE 412, OUT_QUEUE 412 may be locked while the packet is being removed from OUT_QUEUE 412 to prevent a thread from reading OUT_QUEUE 412 while another thread is writing to OUT_QUEUE 412.

It may be determined if the packet includes a reference to POQ 406-*x* (block 704). Block 704 may determine if the packet may be sequenced (e.g., ordered). If the packet does not include the reference, process 700 may proceed to block 706.

Depending on implementation, additional processing may be performed at block 706. For example, in one implementation, the packet may be copied and/or dropped. In another implementation, the packet may be transmitted from service module 206 to one of line interfaces 204-1 through 204-M.

Returning to block 704, if the packet includes a reference to POQ 406-*x*, the reference may be used to locate POQ 406-*x*, so that the packet may be placed in the reserved slot. The packet may be placed in the reserved slot by: matching an arrival position, which may have been written in the packet by process 600, to an index of a slot in POQ 406-*x* (block 708); and writing the arrival position of the packet in the slot.

It may be determined if the slot is the head of POQ 406-*x* (block 710). If the slot is not the head, process 700 may return to block 706. Otherwise, process may proceed to block 712.

At block 712, the packet may be released from POQ 406-*x*. To release the packet, POT 414 may designate a slot that follows the head as the new head of POQ 406-*x*. As explained above in the description of POQ 406-*x*, because packets that are referenced by the reserved slots of POQ 406-*x* are in the order of their arrival, a movement of the head of POQ 406-*x* in one direction (e.g., to the clockwise direction) from one slot to another slot may release the packets in the proper order (i.e., the order in which the packets were received).

It may be determined if POQ 406-*x* is empty (block 714). If POQ 406-*x* is not empty, process 700 may go to block 716. At block 716, it may be determined if a head slot of POQ 406-*x* contains a reference to a packet. In such a case, process 700 may proceed to block 712, where the packet may be released. Returning to block 716, if the head slot does not contain a reference to a packet, process 700 may go to block 706.

Returning to block 714, if POQ 406-*x* is empty (e.g., all slots in POQ 406-*x* are un-reserved), process 700 may proceed to block 718, where POQ 406-*x* may be removed. Removing POQ 406-*x* may involve locking address holder 404-*x*, returning a block of memory that has been allocated for POQ 406-*x* to a free pool, and setting the contents of address holder 404-*x* to a null value. Returning the block of memory to the free pool may render the block available for future use.

At block 706, process 700 may await for an arrival of a packet in OUT_QUEUE 412. When the packet is detected, process 700 may start anew at block 702.

EXAMPLE

The following example, with reference to FIGS. 8 and 9A-9G, illustrates sequencing packets from multiple threads. The example is consistent with exemplary processes 600 and 700 described above with reference to FIGS. 6 and 7.

Figure 8:
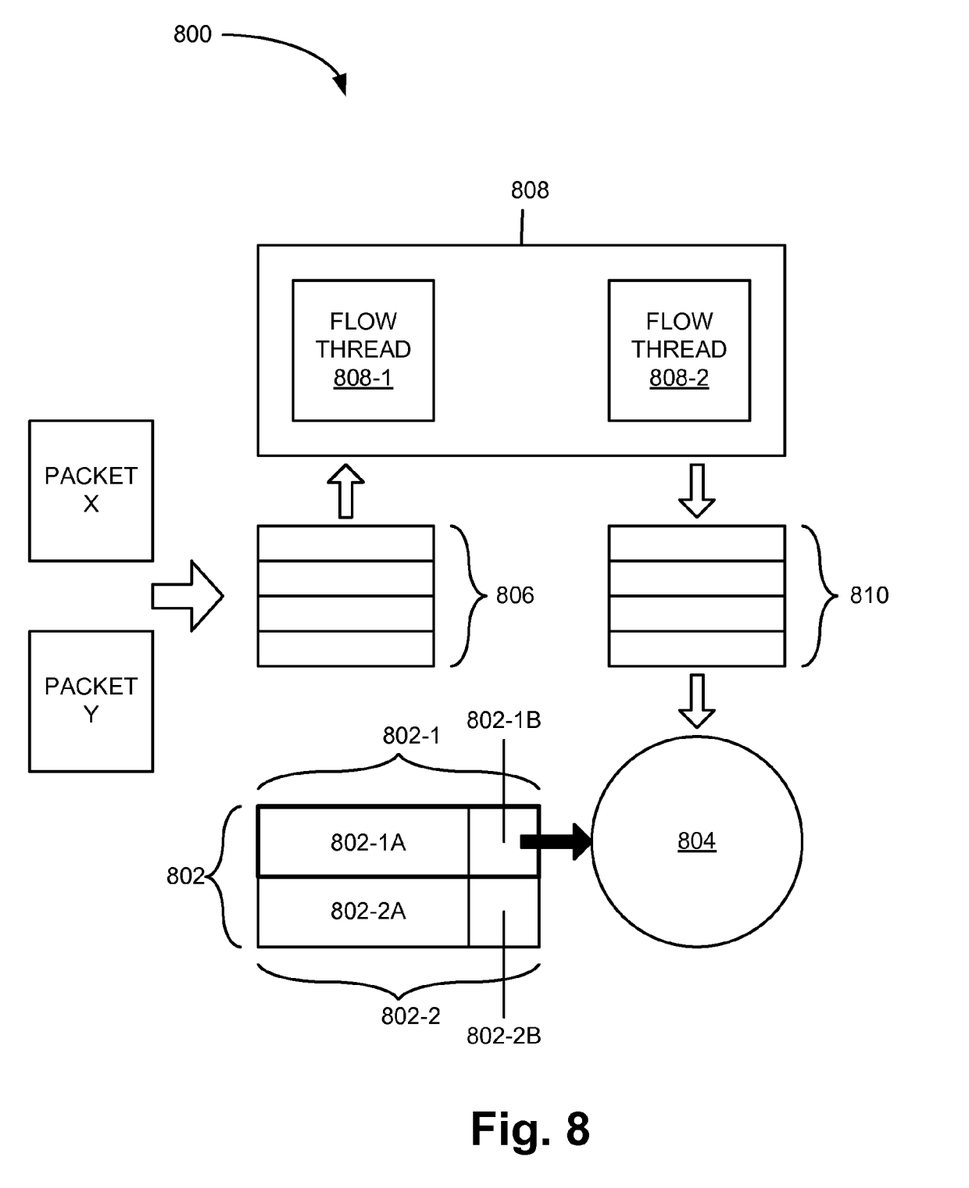
FIG. 8 illustrates flow of packets through some of the components in FIG. 4.

In the example, as illustrated in FIG. 8, service module 800 includes a flow table 802, a POQ 804, an IN_QUEUE 806, flow threads 808-1 and 808-2, and an OUT_QUEUE 810. Other components of service module 800 are not illustrated in FIG. 8. As further shown, flow table 802 includes record 802-1 and 802-2, each of which contains address holder 802-1B, and 802-2B. The contents of address holders 802-1B and 802-2B may be obtained based on the address of flow table 802, which is known. Records 802-1 and 802-2 also includes other flow fields, 802-1A and 802-2A, which contain information related to flows (e.g., flow statistics) that are associated with incoming packets.

Figure 9A:
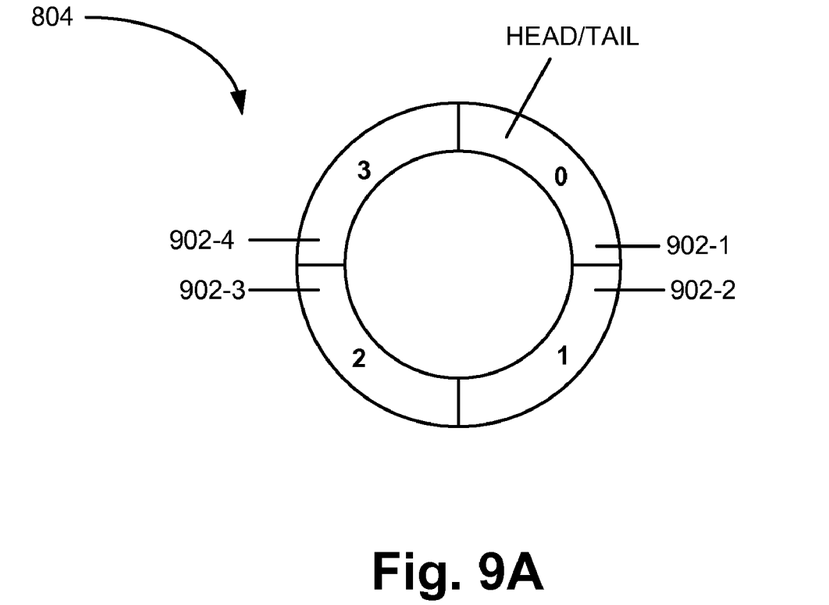
FIGS. 9A-9G illustrate another exemplary POQ in different configurations.

As illustrated in FIG. 9A, assume that POQ 804 has four slots 902-1 through 902-4. Also assume that the tail and the head of POQ 804 are at slot 902-1.

When packet X arrives at service module 800, a PDT (not shown) may look up a flow record for the flow to which packet X belongs. Upon finding flow record 802-1, the PDT determines that there is address holder 802-1B for packet X. The PDT locks flow record 802-1. Using flow record 802-1, the PDT obtains contents of address holder 802-1B and examines the contents to determine if a POQ exists. The PDT determines that POQ 804 exists based on a non-null value in address holder 802-1B, and prepares packet X to be placed in IN_QUEUE 806.

To prepare packet X, the PDT reserves a slot in POQ 804 by assigning the tail of POQ 804 to slot 902-2 and writing the slot number "0" (i.e., the arrival position of packet X) in packet X. Furthermore, the PDT writes an identifier associated with PDQ 804 in packet X. The PDT unlocks flow record 802-1, and places packet X in IN_QUEUE 806.

Figure 9B:
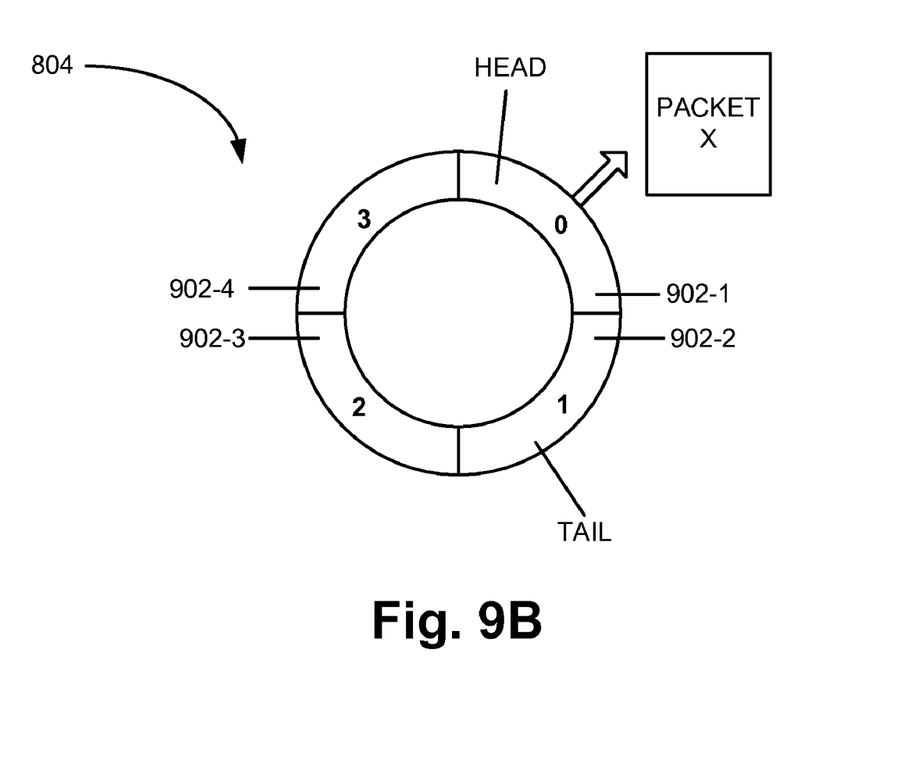

FIG. 9B shows the configuration of POQ 804 after packet X has been placed in IN_QUEUE 806. In contrast to FIG. 9A, slot 902-1 is shown as being associated with packet X, and the tail of POQ 804 is at slot 902-2.

When packet Y arrives at service module 800, the PDT performs similar operations for packet Y as the ones PDT has performed for packet X. In brief, the PDT looks up a flow record for packet Y, and finds flow record 802-1. The PDT locks flow record 802-1, and prepares packet Y to be placed in IN_QUEUE 806.

To prepare packet Y, the PDT reserves a slot in POQ 804 by assigning the tail of POQ 804 to slot 902-3 and writing the slot number "1" (i.e., the arrival position of packet Y) in packet Y. Furthermore, the PDT writes an identifier associated POQ 804 in packet Y. The PDT unlocks flow record 802-1 and places packet Y in IN_QUEUE 806.

Figure 9C:
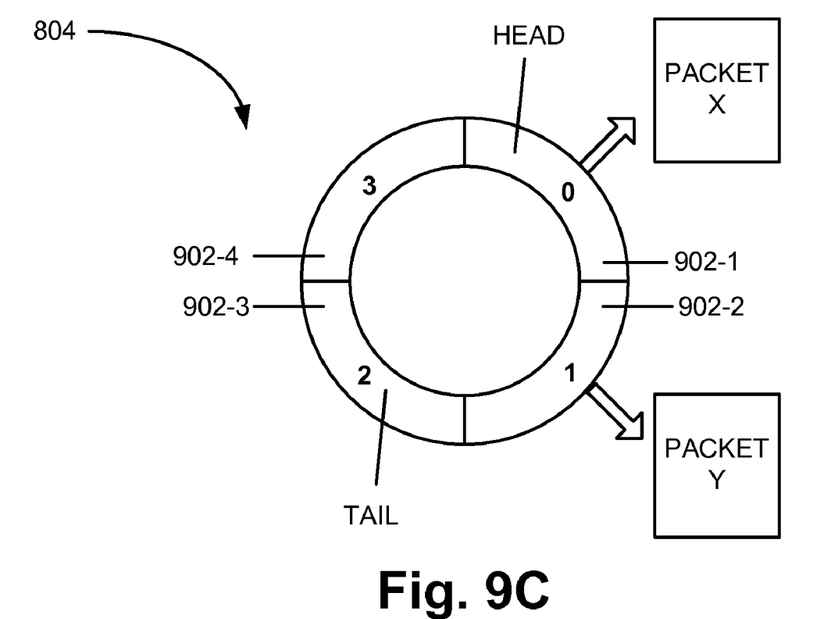

FIG. 9C shows the configuration of POQ 804 after packet Y has been placed in IN_QUEUE 806. Slot 902-2 is associated with packet Y, and the tail of POQ 804 has shifted to slot 902-3.

Assume that flow thread 808-1 removes packet X and flow thread 808-2 removes packet Y from IN_QUEUE 806. In addition, assume that flow thread 808-2 finishes processing packet Y before flow thread 808-1 finishes processing packet X. Consequently, packet Y is placed in OUT_QUEUE 810 before packet X.

From OUT_QUEUE 810, a POT (not shown) removes packet Y. The POT examines packet Y and determines that packet Y includes a reference to POQ 804. Subsequently, the POT matches packet Y's arrival position, which is "1" written by the PDT, to the index of 1 of slot 902-2. The POT writes a reference to packet Y in slot 902-2.

Figure 9D:
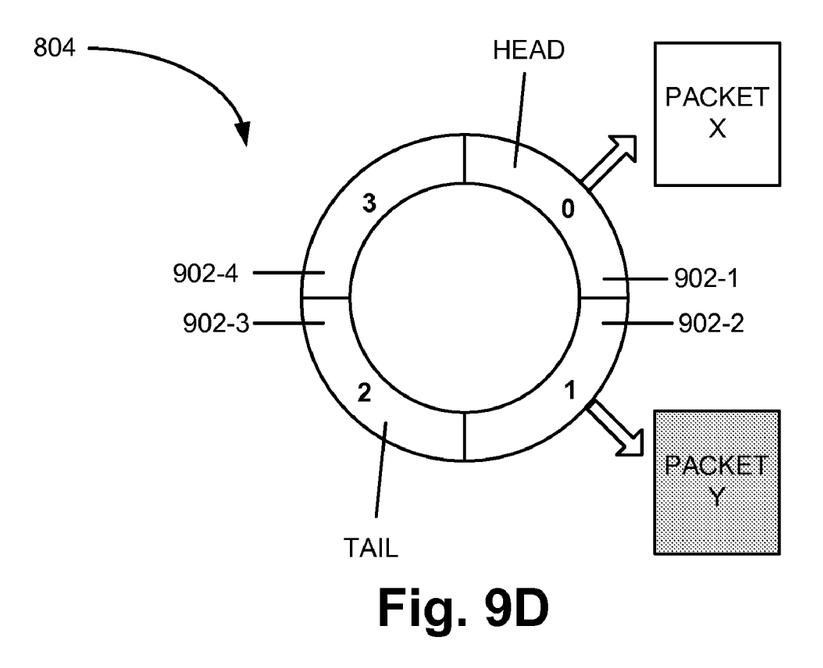

FIG. 9D shows the configuration of POQ 804 after the preceding operation has been performed by the POT. The configuration is similar to that shown in FIG. 9C, except that packet Y is darkened to illustrate that packet Y's arrival position has been matched to the index of slot 902-2.

The POT determines that slot 902-2, which is associated with packet Y, is not the head of POQ 804 and proceeds to handle packet X. The POT remove packet X from OUT_QUEUE 810 and examines packet X. The POT determines that packet X includes a reference to POQ 804. Subsequently, the POT matches packet X's arrival position, which is "0," to the index 0 of slot 902-1. The POT writes a reference to packet X in slot 902-1.

Figure 9E:
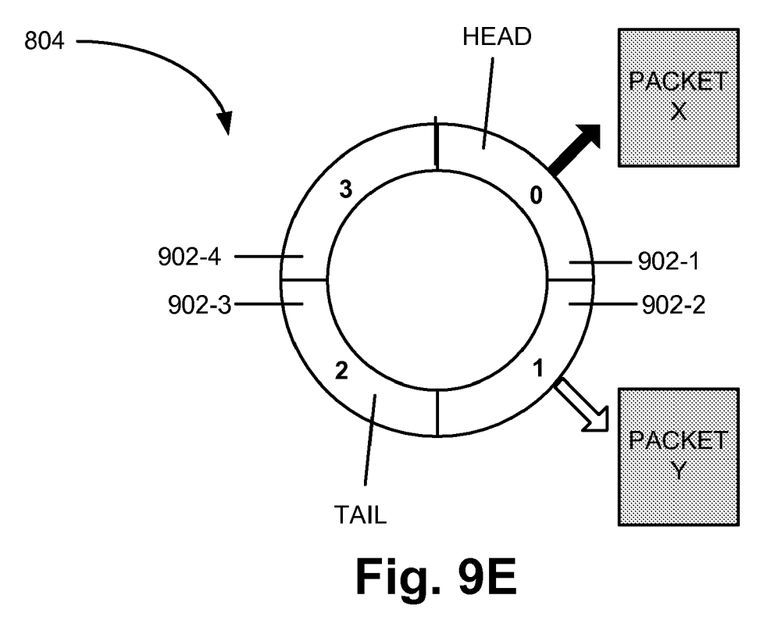

FIG. 9E shows the configuration of POQ 804 after the preceding operation has been performed by the POT. The configuration is similar to that shown in FIG. 9D, except that packet X is darkened to illustrate that packet X's arrival position has been matched to the index of slot 902-1.

Figure 9F:
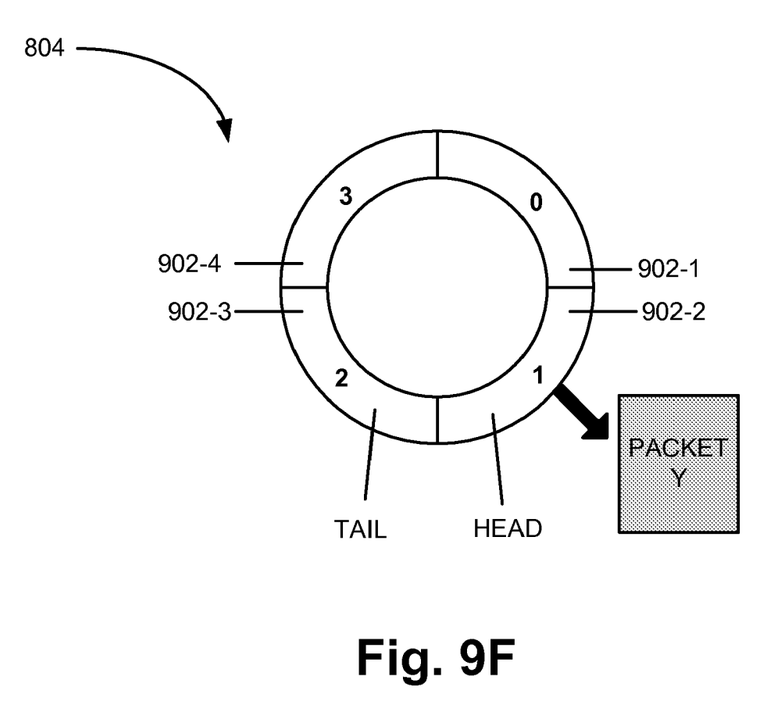

The POT determines that slot 902-1, which is associated with packet X, is the head of POQ 804. The POT releases packet X from POQ 804, by designating slot 902-2 as the new head of POQ 804. FIG. 9F shows the configuration of POQ 804 after packet X has been released from POQ 804.

Figure 9G:
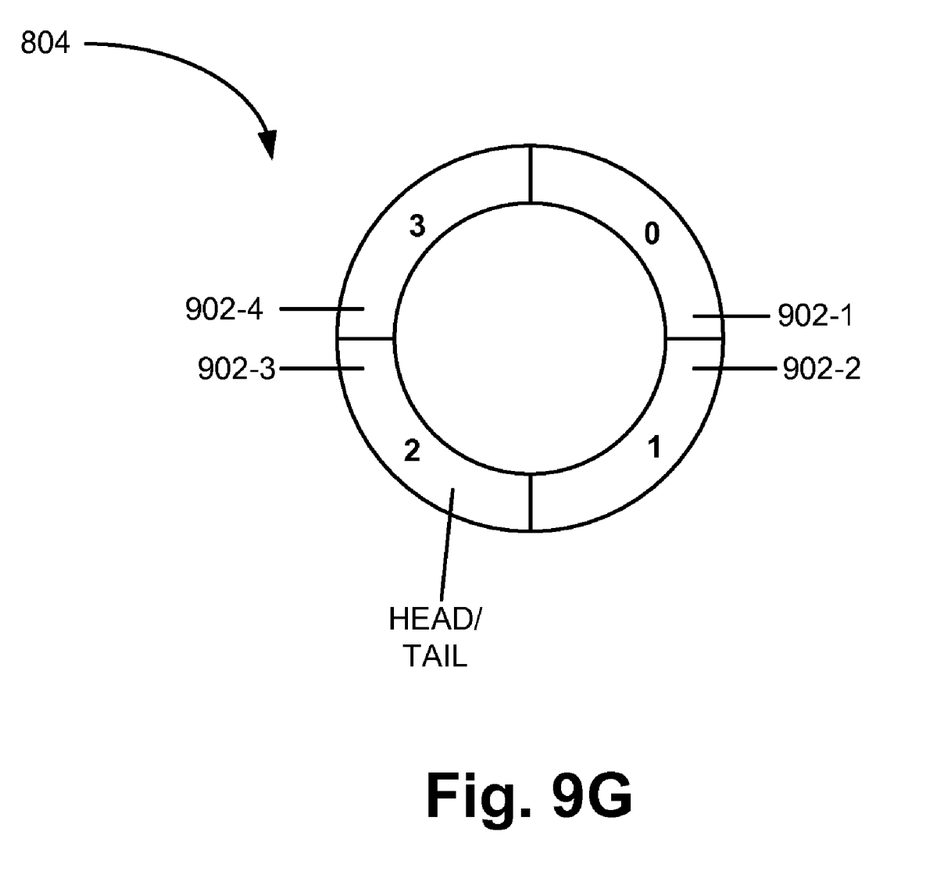

After packet X has been released, the POT realizes POQ 804 is not empty. The POT determines if the head slot (e.g., "1" in FIG. 9F) contains a reference to packet Y. Upon finding that the head slot contains the reference, the POT releases packet Y from POT 804, by designating slot 902-3 as the new head of POQ 804. FIG. 9G shows the configuration of POQ after packet Y has been released from POQ 804.

The above example demonstrates how a circular buffer may be used to sequence processed packets in the same order that the packets were received at PDT 402. After the packets are received, multiple threads may process them in parallel. However, because processing delays for different threads are variable, the threads may finish processing the packets out-of-order.

To ensure processed packets are output in a proper sequence, slots on the circular buffer may be reserved in the sequence that the packets were received. After the packets are processed by the threads, the packets may be placed in the reserved slots. The referenced packets may be released from the slots only in the order that the slots have been reserved, and, therefore, in the order the packets were received at PDT 402.

CONCLUSION

The foregoing description of implementations provides illustration, but is not intended to be exhaustive or to limit the implementations to the precise form disclosed. Modifications and variations are possible in light of the above teachings or may be acquired from practice of the teachings.

For example, while series of blocks have been described with regard to exemplary processes illustrated in FIGS. 6 and 7, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A device comprising:
   a plurality of service threads for processing packets;
   one or more packet ordering queues (POQs) for ordering the packets after the plurality of service threads process the packets;
   a packet distribution thread to:
      receive the packets,
      determine whether a particular POQ of the one or more POQs is assigned to the packets;
      allocate the particular POQ to the packets when the particular POQ is not assigned to the packets; and
      reserve slots in the particular POQ for the packets in an order of their arrival;
   an ingress queue to:
      provide the packets from the packet distribution thread to the plurality of service threads;
   an egress queue to:
      receive the packets from the plurality of service threads after the plurality of service threads process the packets, and store the received packets in an order that is different from the order of their arrival at the packet distribution thread; and a packet ordering thread to:
obtain the packets from the egress queue,
place information relating to the packets in the reserved slots in the particular POQ,
release the packets from the reserved slots in the order of their arrival at the packet distribution thread, where, when releasing a particular one of the packets, the packet ordering thread is to:
identify a particular slot, in the particular POQ, that is currently designated as a head slot, where the particular slot is associated with the particular packet,
release the particular packet upon determining that the particular slot, associated with the particular packet, is designated as the head slot, and
designate a next slot, that immediately follows the particular slot in the POQ, as the head slot, and
remove the particular POQ upon determining that the head slot, in the particular POQ, is not associated with any packets.

2. The device of claim 1, where the device includes a router, a switch, or a firewall.

3. The device of claim 1, further comprising:
a flow table that pertains to the packets.

4. The device of claim 1, where the packet distribution thread includes at least one of:
a thread instance; or
a program instance.

5. The device of claim 1, where when removing the particular POQ, the packet ordering thread is to:
return a block of memory, associated with the device, that has been allocated for the particular POQ, to a free memory pool.

6. A method performed by a device, the method comprising:
allocating, by one or more processors of the device, a block of memory, associated with the device, for a packet ordering queue (POQ);
receiving, by the device, a packet;
determining, by the one or more processors of the device, whether the POQ is assigned to the received packet;
assigning the POQ to the received packet when the POQ is not assigned to the received packet;
reserving, by one or more processors of the device, a slot for the received packet in the POQ;
designating, by one or more processors of the device, a particular slot in the POQ as a tail of the POQ;
placing, by the one or more processors of the device, the received packet in an ingress queue;
conveying, by the one or more processors of the device, the received packet from the ingress queue to one of a plurality of threads for processing;
obtaining, by the one or more processors of the device, the received packet from the one of the plurality of threads after the received packet has been processed;
placing, by the one or more processors of the device, the processed packet in an egress queue, where the processed packet is placed in the egress queue before another packet, where the other packet is received by the device before the processed packet is received by the device;
placing, by the one or more processors of the device, the processed packet, from the egress queue, in the POQ in a position of the reserved slot;
releasing, by the one or more processors of the device and after the other packet is released, the processed packet from the POQ when the reserved slot is a head of the POQ;
designating, by the one or more processors of the device and after releasing the processed packet from the POQ, a next slot, that immediately follows the reserved slot, as the head of the POQ;
determining, by the one or more processors of the device and after designating the next slot as the head of the POQ, that the next slot has been designated as the tail of the particular POQ; and
releasing, by the one or more processors of the device, the block of memory that was allocated for the POQ.

7. The method of claim 6, where releasing the processed packet includes:
outputting the processed packet from the POQ.

8. The method of claim 6, where reserving the slot for the received packet includes:
writing an index, which is associated with the reserved slot, into the received packet; and
making the reserved slot unavailable for another reservation.

9. The method of claim 8, where placing the processed packet in the POQ includes:
matching the index in the processed packet to an index associated with one of a plurality of slots in the POQ; and
writing a reference to the processed packet in the one of the plurality of slots.

10. The method of claim 8, where making the reserved slot unavailable for another reservation includes:
designating another slot that immediately follows the reserved slot as a tail of the POQ.

11. The method of claim 6, further comprising:
locating a flow record related to the received packet; and
determining, based on the flow record, that the POQ does not exist,
where the allocating is performed upon determining that the POQ does not exist.

12. The method of claim 11, where locating the flow record includes:
determining if the flow record exists based on header information of the received packet.

13. The method of claim 11, further comprising:
locking the flow record to prevent the POQ from being removed or modified by another thread.

14. A method performed by a device, the method comprising:
receiving, by the device, packets in a sequence;
determining, by one or more processors of the device, whether a packet ordering queue (POQ) of a plurality of POQs is assigned to the received packets;
assigning, by one or more processors of the device, the POQ to the received packets when the POQ is not assigned to the received packets;
reserving, by one or more processors of the device, slots for the received packets in the POQ, where the reserving includes designating one slot, in the POQ, as a head slot;
transferring, by one or more processors of the device, the received packets to a plurality of flow threads;
obtaining, by one or more processors of the device, the received packets from the plurality of flow threads out-of-order;
placing, by one or more processors of the device, the out-of-order packets in the reserved slots;

sending, by one or more processors of the device, the packets from the POQ in the sequence, where sending a particular one of the packets includes:
identifying a particular slot, in the POQ, that is currently designated as the head slot, where the particular slot is associated with the particular packet,
sending the particular packet upon determining that the particular slot, associated with the particular packet, is designated as the head slot, and
designating a next slot, that immediately follows the particular slot in the POQ, as the head slot; and removing, by the one or more processors of the device, the POQ after all of the packets, in the sequence, have been sent, where the removing includes:
determining that the head slot, in the POQ, is not associated with any packets.

15. The method of claim 14, where removing the POQ includes:
returning a block of memory, that has been allocated for the POQ, to a free memory pool.

* * * * *